(12) United States Patent
Taranekar et al.

(10) Patent No.: US 8,299,139 B1
(45) Date of Patent: Oct. 30, 2012

(54) PROCESS AND REACTOR FOR SYNTHESIS OF ULTRA-HIGH MOLECULAR WEIGHT ACRYLIC POLYMERS

(75) Inventors: Prasad Taranekar, Cleveland, OH (US); Austin L. Schuman, Wadsworth, OH (US); Asis Banerjie, Medina, OH (US)

(73) Assignee: Ovation Polymer Technology and Engineered Materials, Inc., Medina, OH (US)

( * ) Notice: Subject to any disclaimer, the term of this patent is extended or adjusted under 35 U.S.C. 154(b) by 232 days.

(21) Appl. No.: 12/875,526

(22) Filed: Sep. 3, 2010

Related U.S. Application Data

(60) Provisional application No. 61/240,348, filed on Sep. 8, 2009.

(51) Int. Cl.
C08J 3/28 (2006.01)
C08F 2/46 (2006.01)

(52) U.S. Cl. ......... 522/114; 522/116; 522/120; 522/125

(58) Field of Classification Search ................. 522/114, 522/116, 120, 125, 173, 175, 182, 172, 185, 522/188
See application file for complete search history.

(56) References Cited

U.S. PATENT DOCUMENTS

| | | | | |
|---|---|---|---|---|
| 4,330,590 A | * | 5/1982 | Vesley | 428/336 |
| 5,183,833 A | * | 2/1993 | Fisher et al. | 522/182 |
| 5,462,797 A | * | 10/1995 | Williams et al. | 428/345 |
| 5,690,863 A | * | 11/1997 | Schuman | 252/582 |
| 5,951,920 A | * | 9/1999 | Schuman et al. | 252/582 |
| 6,040,352 A | * | 3/2000 | Wright | 522/2 |
| 7,268,179 B2 | | 9/2007 | Brown | 524/548 |

OTHER PUBLICATIONS

Melchilef et al ("Effect of High Molecular Weight Acrylic Copolymers on the Viscoelastic Properties of Engineering Resins", Journal of Vinyl & Additive Technology, (2006)).

* cited by examiner

*Primary Examiner* — Susan W Berman
(74) *Attorney, Agent, or Firm* — Alvin T. Rockhill

(57) ABSTRACT

This invention relates to a process for producing high molecular weight (HMW) and ultra-high molecular weight (UHMW) acrylic polymers having unique polymer tacticity and exhibiting enhanced thermal and mechanical properties. This process comprises polymerizing ethylenically unsaturated monomer in the presence of a free radical initiator that results in a "living-like polymer" utilizing a multi-step approach. In conducting the process of this invention the "living-like polymer" is further dissolved in a liquid carrier, wherein the said liquid carrier is a reactive diluent that can be reacted subsequently by an addition polymerization process to create a block- or multi-block, copolymer or homopolymer. This process can be progressively repeated with the same or various different reactive diluents to generate desired architecture and molecular weight polymer(s) which can be used in further processing procedures to be manufactured directly into finished articles.

5 Claims, 5 Drawing Sheets

PROCESS AND REACTOR FOR SYNTHESIS OF ULTRA-HIGH MOLECULAR WEIGHT ACRYLIC POLYMERS

This application claims the benefit of U.S. Provisional Patent Application Ser. No. 61/240,348, filed on Sep. 8, 2009. The teachings of U.S. Provisional Patent Application Ser. No. 61/240,348 are incorporated herein by reference in their entirety.

FIELD OF THE INVENTION

The present invention relates to a technique for synthesizing ultra-high molecular weight acrylic polymers and copolymers that exhibit enhanced mechanical properties, thermal stability, and processing characteristics. It further relates to a reactor system that is particularly useful for conducting photo-initiated polymerizations that are useful in the synthesis of such ultra-high molecular weight polymers.

BACKGROUND OF THE INVENTION

Free radical polymerization processes are generally chemically less sensitive than anionic processes to impurities in the monomers or solvents typically used and are substantially or completely insensitive to water. The present invention provides product polymer with a photoactive functional group on at least one end which can be used for further reaction to prepare other polymers. The present invention provides polymerization processes that enable control of polymer molecular weight, modality of the products, and the like properties. High molecular weight (HMW) and ultra-high molecular weight (UHMW) are fundamental factors enhancing the physical properties and the ability of introducing multi-functional groups in polymers to be used in diverse applications. The incredibly long molecular chain allows a host of exceptional attributes such as excellent balance of optical and mechanical characteristics, such as impact chemical and abrasion resistance and optical clarity in the said acrylic polymers.

It is difficult or impossible to polymerize certain monomers and to copolymerize various combinations of monomers in a controlled manner to attain polymers of the desired high and ultra-high molecular weight. For instance, the molecular weight of polymers made by free radical polymerization is generally inversely proportional to the amount of free radical initiator used to initiate the polymerization. However, at the low levels of initiator that are needed to attain high and ultra-high molecular weight polymers controlling the ultimate molecular weight of the polymer becomes increasingly more difficult and in many cases it is impossible to attain desired molecular weights. In addition to attaining desired molecular weight, tacticity control, the synthesis of polymers having pseudo-block type architecture and other parameters, such as scalability, are also frequently very important.

SUMMARY OF THE INVENTION

The present invention is directed to living-like polymer or pseudo-living polymerization processes which permit the preparation of homopolymer, random copolymer and block like copolymer acrylics comprising of high and ultra high molecular weights via UV polymerization. Free radical polymerization reactions are generally preferred. Reaction temperatures suitable for use in the present method are normally within the range of about −10° C. to 50° C. Before the polymerization, monomer(s) must be purified to reduce levels of agents that hinder UV polymerization, (such as inhibitors, undesired metals and metallic ions). In practicing the subject invention it is important to utilize relatively low polymerization temperatures and initiator levels to obtain the ultra high molecular weight desired. This polymerization process can be described as being a "cold polymerization" and this term is used to describe the condition of keeping the total system temperature low and controlled during monomer conversion into the polymeric material. During the bulk polymerization process, the monomer(s) and/or monomer blends are constantly and continually mixed to ensure that the monomer(s) are homogenous during the conversion to polymer, which is living-like as the free radical on the polymer is still active.

The technique of this invention can be used to produce a wide variety of polymers having a controlled ultra-high molecular weight. These polymers can be tailored to provide enhanced mechanical, thermal, optical and processing parameters for desired applications. For instance, this technique is of particular value in producing polyacrylates having a refractive index and ultra-high molecular weight which make them particularly suitable for use in the opto-electronics industry, for instance in making optical fibers.

The ultra-high molecular weight polymers of this invention can be made utilizing either a single step or a multiple step procedure. Both of these procedures offer distinct advantages over prior art procedures. In the single step process, the UHMw is synthesized in one polymerization step. However, in a multistep procedure, the monomer is polymerized into a base polymer with the base polymer subsequently being dissolved in a reactive diluent (which can be a single monomer or mixture of monomers in which the base polymer is soluble) with polymerization being continued to attain the desired ultra-high molecular weight. The single step process offers the advantage of attaining ultra-high molecular weight in a matter of hours as compared to multi-step procedure which can take days. The multiple step process offers control of viscosity, molecular weight, tacticity, and other physical properties in a well controlled manner in each polymerization step. The multi-step procedure of this invention can also be used to make pseudo block polymers having, for instance, an A-B architecture wherein A represents a block of a first monomer and B represents a random block or a tapered block of the first monomer and one or more additional monomers.

The base polymer is dissolved in a reactive diluent(s) or liquid carrier. This process provides a means for producing addition polymer using reactive diluents as the liquid carrier rather than using conventional organic solvents as the liquid carrier, permitting the attainment of high solids (low VOC) UHMw polymer. As used herein, reactive diluents shall mean materials capable of functioning as a solvent for the components of an addition polymerization process of the present reactive HMw polymer, wherein said materials do not react to any substantial degree with the monomers used or polymer formed during the addition polymerization process, but wherein said materials have functionality that can be reacted subsequent to the addition polymerization process in the presence of the monomer or polymer. The reactive diluents of the present invention act as a solvent for both the monomers and for the polymer produced. The reactive diluent(s) should be selected such that it does not catalyze either the polymerization or any cross-linking reactions. The result of this method will be a repetition of corresponding polymer generated step wise and mixing it in reactive diluents and polymerizing again to gradually generate high molecular weight at each step and ultimately generate UHMw polymer-final, which will be able to finish into a film, sheet, rod, or any other useful form.

High and ultra-high molecular weight polymers made utilizing the reactor and technique of this invention are in some cases made by a multiple step process to attain the desired molecular weight and desired polymer properties for practical applications. These multiple steps are carried out by adding additional monomer and optionally additional solvent and/or initiator to the polymer system made by the first or an intermediate polymerization step. The final polymer solution or syrup made by utilizing the technique of this invention can be cured into articles of desired shape by exposure to ultra-violet light, electron beams or thermal processing.

The high and ultra high molecular weight polymers made possible by utlizing the techniques of this invention are particularly desirable for utilization in applications where clarity, UV resistance, and high toughness are needed. For instance, these polymers are of particular value for utilization in manufacturing goggles, shields, protective glasses, bullet-proof glass, and aircraft parts including canopies, windows, lenses, windscreens, laminates, and panels.

DETAILED DESCRIPTION OF THE INVENTION

Figure 1:
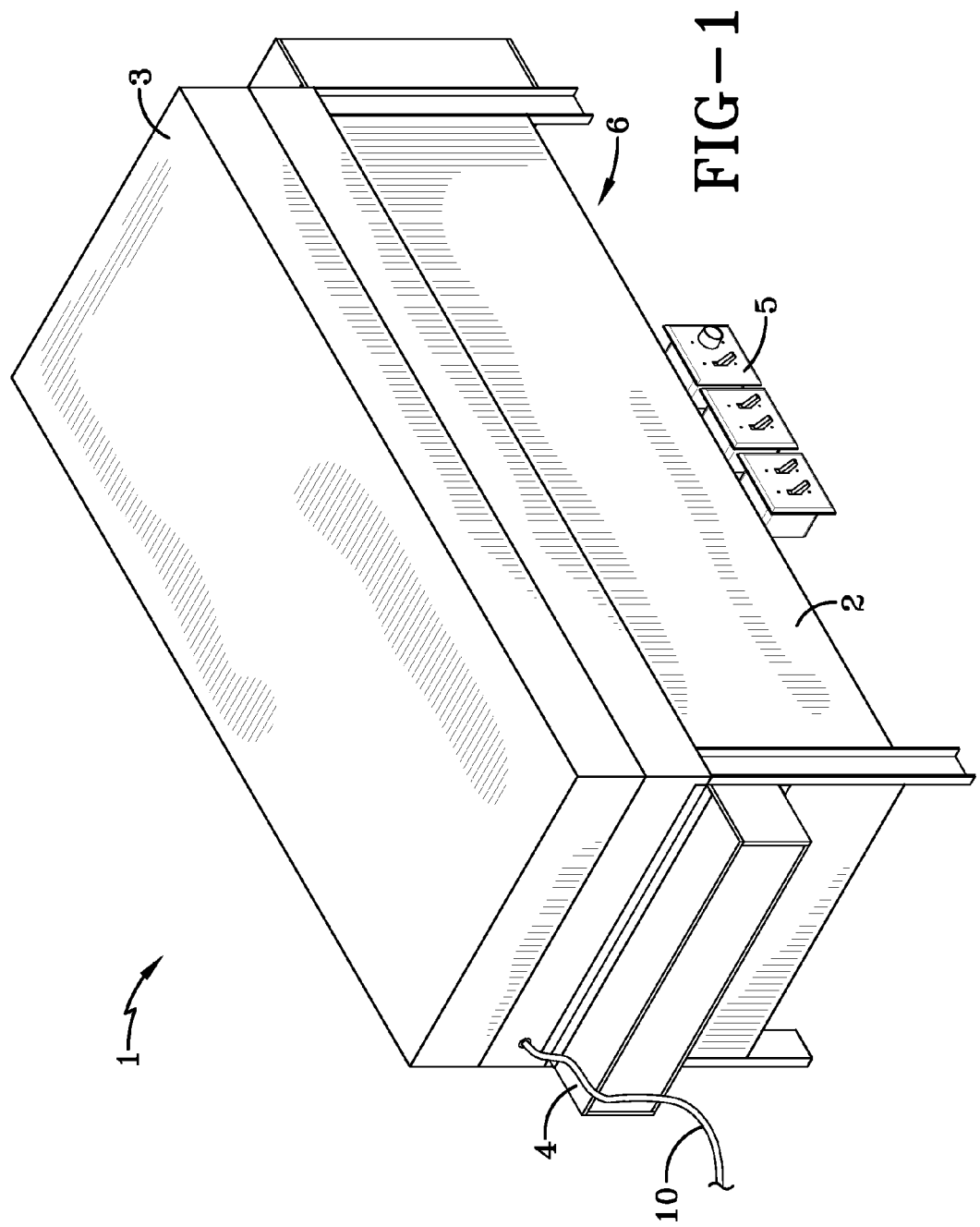
FIG. 1 is a perspective view of the reactor of this invention with the lid of the reactor being closed.

The reactors of this invention 1 are illustrated in FIGS. 1-5. This reactor includes a reactor housing 2, a lid 3, a motor housing 4, and a control panel 5. The reactor housing 2 contains at least one cylindrical reaction chamber 6 (see FIG. 5 and FIG. 6) having walls that are essentially transparent to ultra-violet light and rotating rollers 7 for supporting the cylindrical reaction chamber(s). The reactor will also include a means for introducing cooling air into the housing, such as an air inlet 8 (see FIG. 3 and FIG. 4), a source of ultra-violet light 9, and at least one temperature probe, such as a thermocouple that is connected to a temperature monitor through electrical wires 10.

To improve the efficiency of the reactor and to reduce electrical power needed to operate it, the inside of the reactor housing 2 will preferably be covered with mirrors or some other reflective material, such as polished metal, that will reflect the ultra-violet light rather than absorbing it. The lid 3 will be designed to close and seal the reactor housing to prevent ultra-violet light from escaping from the inside of the housing during operation. It is also critical for the lid 3 to be of sufficient size to allow for cylindrical reaction chambers to be placed in the removed from the reactor housing 2. The motor housing contains motors that power the rotation of the rotating rollers 7 that support and turn the cylindrical reaction chambers 6. In operation the rotating rollers 7 counter-rotate with respect to the rotating rollers that are immediately adjacent to them. The control panel 5 will typically include an on-off switch for the ultra-violet light source, on-off switch for the motors that power the rotating rollers, a control knob for controlling the rotation rate of the rollers for the reaction vessels, and a control knob for setting the fan speed for circulating cooling air through the reactor as a means for ultimately controlling the reaction temperature.

Figure 2:
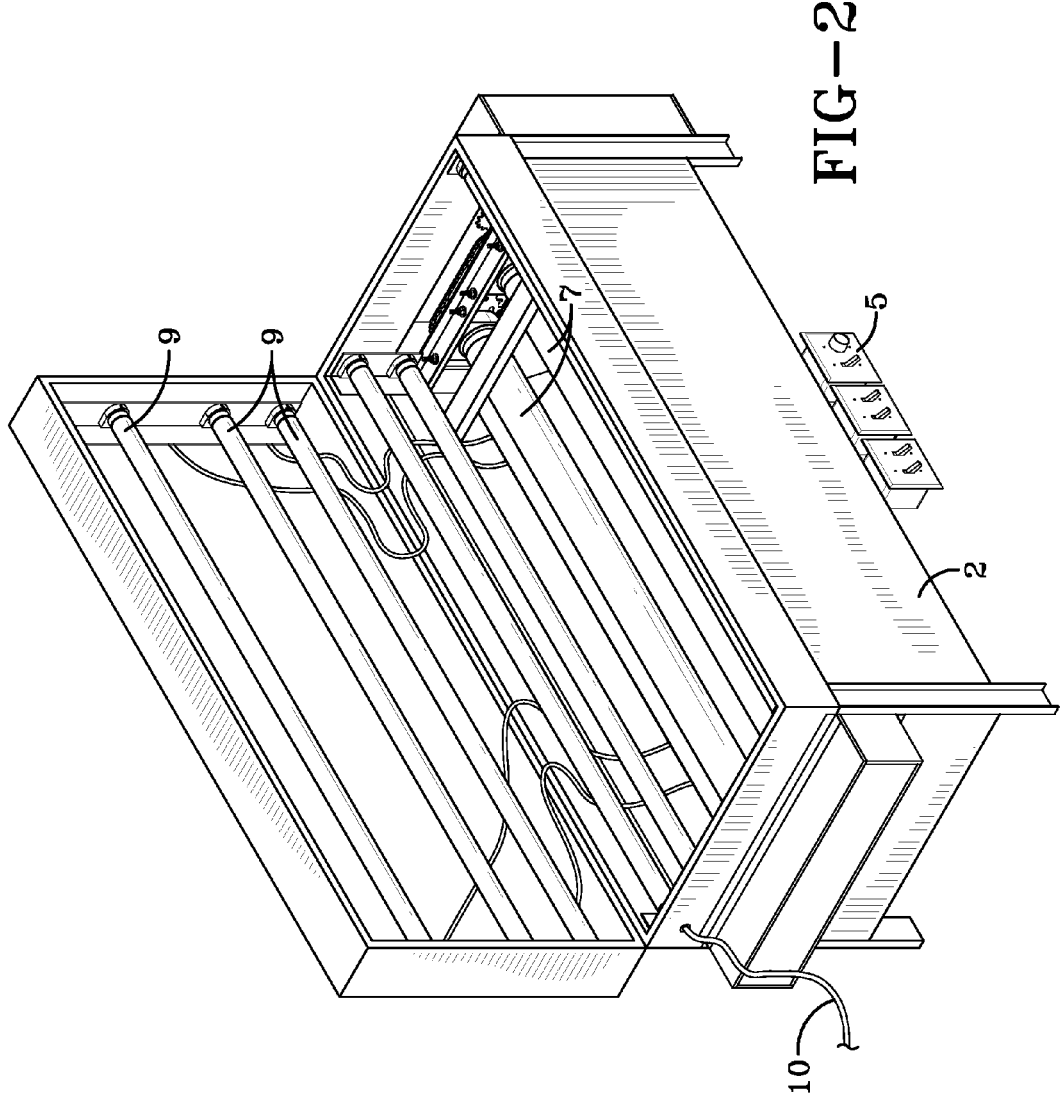
FIG. 2 is a perspective view of the reactor of this invention with the lid of the reactor being in an open position.
Figure 3:
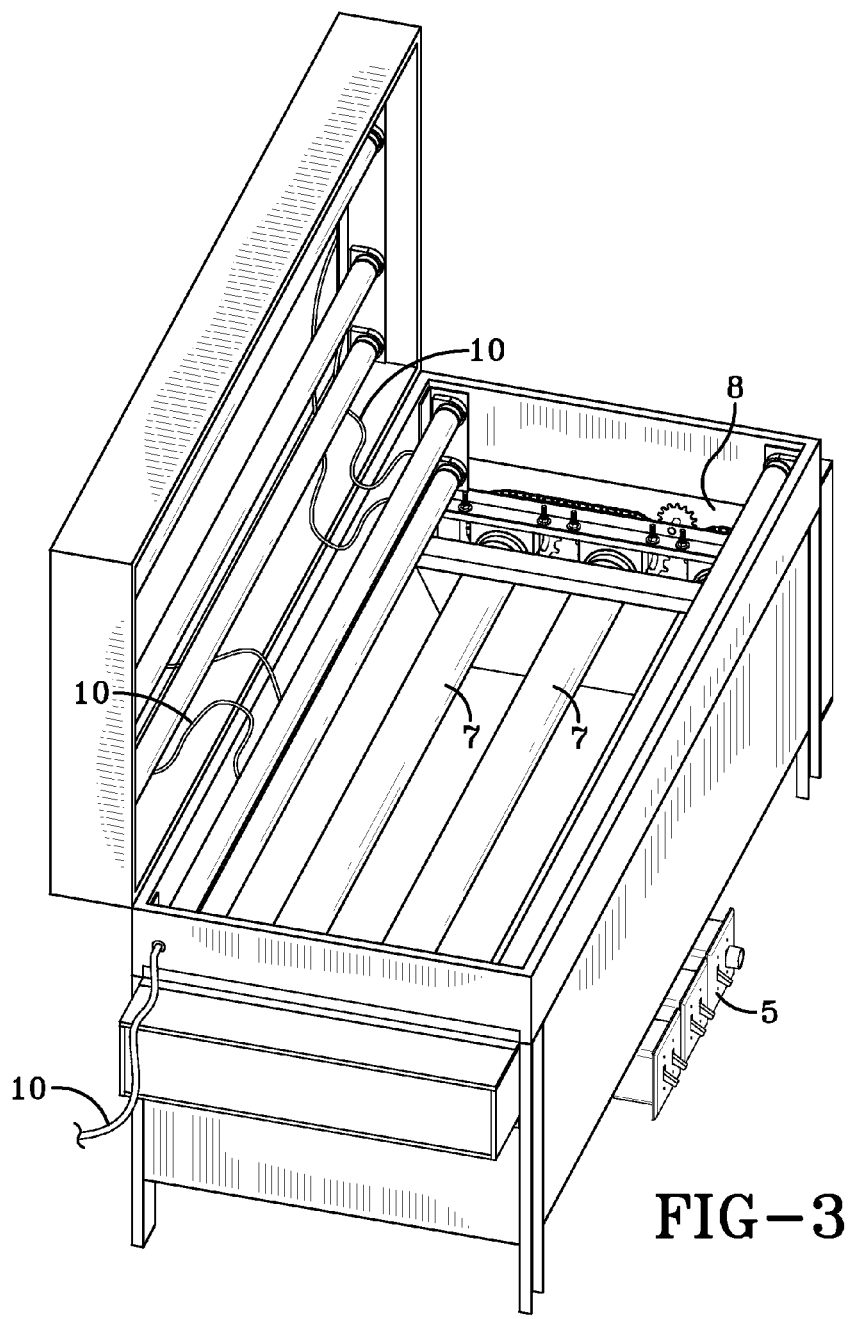
FIG. 3 is a top view of the reactor of this invention with the lid of the reactor being in an open position.
Figure 4:
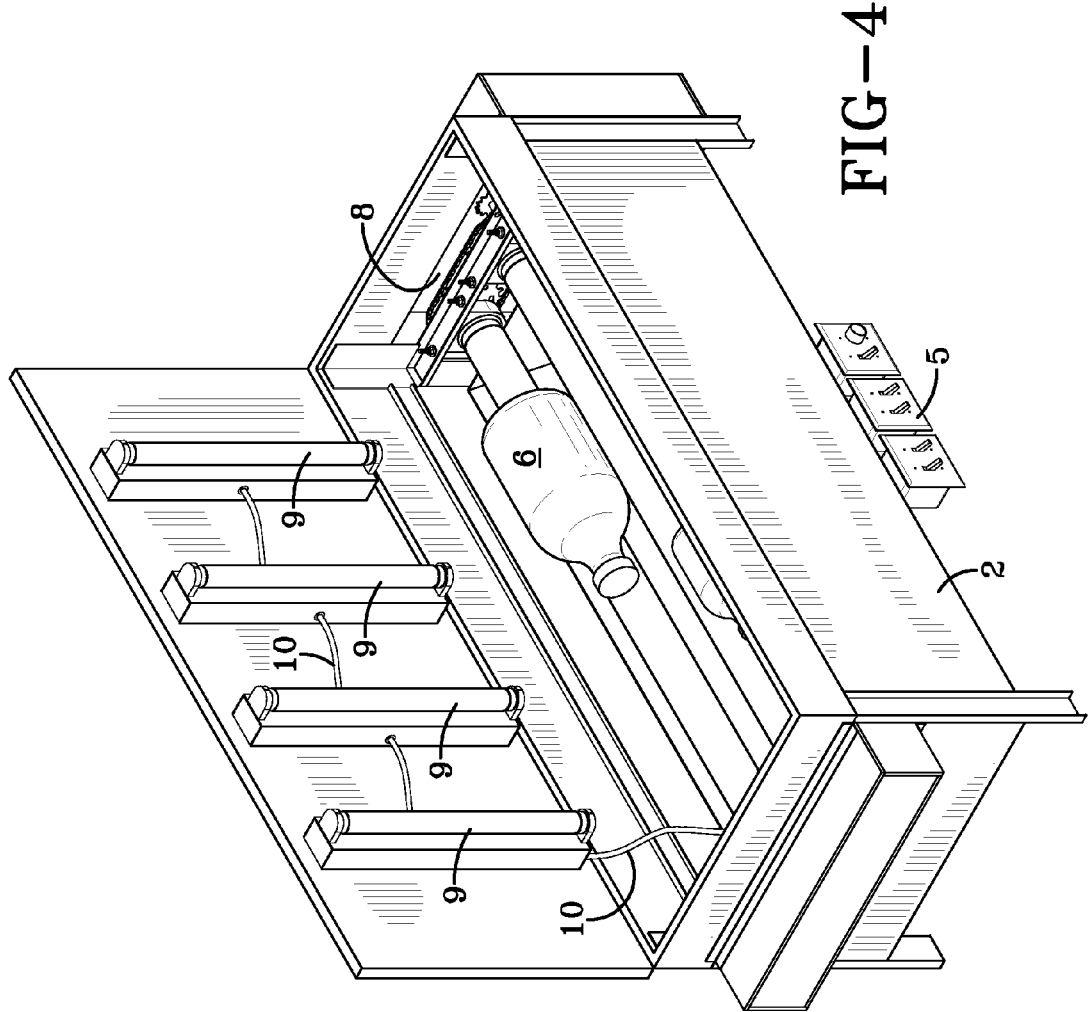
FIG. 4 is a perspective view of the reactor showing a glass cylindrical reaction chamber therein.
Figure 5:
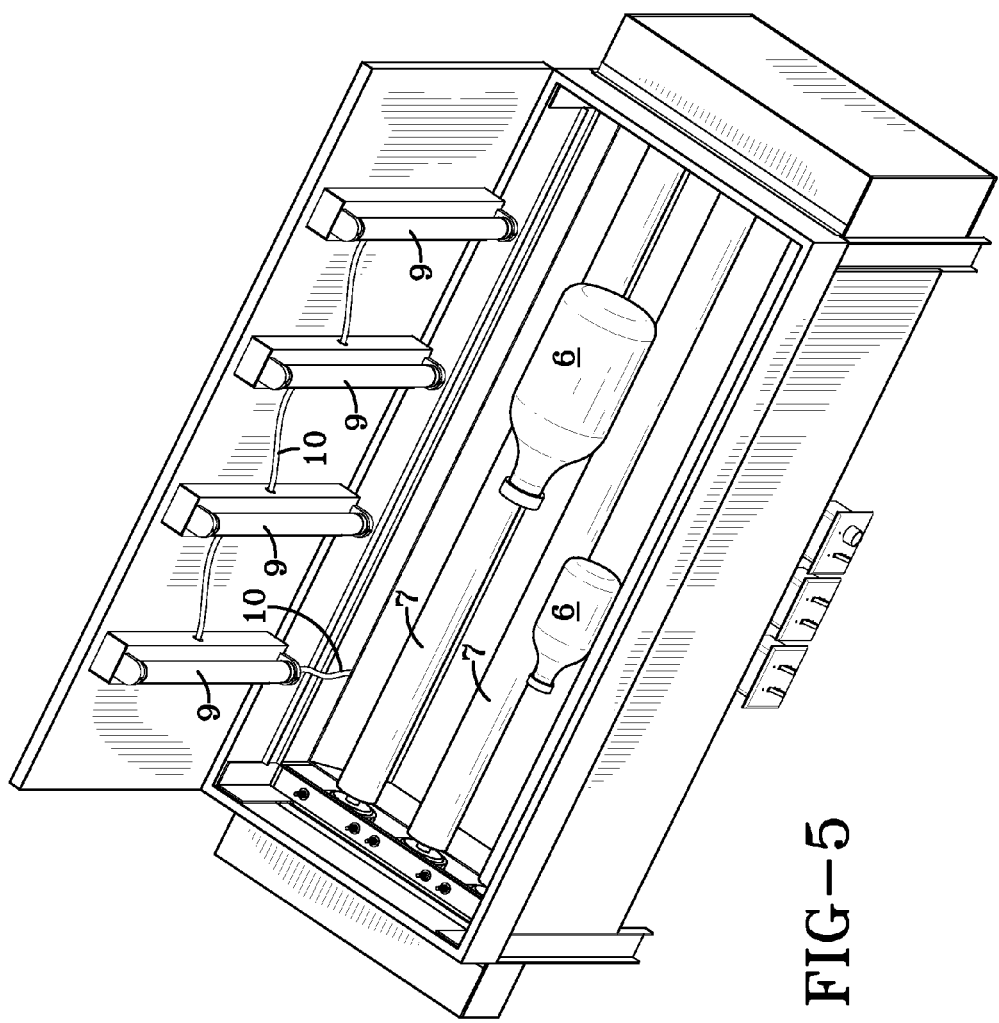
FIG. 5 is a top view of the reactor showing a large cylindrical reaction chamber and a small cylindrical reaction chamber therein.

It is preferred for the UV source to be oriented in a manner whereby the UV light produced is aligned primarily in a manner which is parallel or perpendicular to the orientation of the cylindrical reactors. For instance, in the case of tubular UV lights, the cylindrical reactors will be oriented in a direction parallel to the orientation of the tubular UV tube which is also parallel to the orientation of the rollers in the reactor (as shown in FIG. 2). In another embodiment of this invention, the UV source is aligned perpendicular to the rotational axis of the cylindrical reactor to attain unique polymer architecture and desired molecular weight characteristics (as shown in FIG. 4 and FIG. 5). In still another embodiment of this invention, the UV light is concentrated in only a portion of the cylindrical reactor. In this scenario, it can be desired to totally fill the cylindrical reaction chamber with monomer and/or solvent to achieve a maximization of inhomogeneity. On the other hand, to attain a highly homogeneous polymeric product, the reaction vessel is only partially filled (40 to 80 percent, preferably 60 to 70 percent full) and/or inert glass marbles, which are used for greater agitation or dispersion of various inorganic and/or organic fillers, are inserted into the cylindrical reactor to facilitate blending during the polymerization reaction.

Polymerizations are typically conducted utilizing this reactor by charging monomer(s) and/or a solvent system (either reactive diluents or non-reactive diluents) into a cylindrical reaction chamber. The ultimate molecular weight of the polymer produced is also dependent upon the concentration of monomer in systems that include both reactive and/or non-reactive diluents. The cylindrical reaction chamber is then sealed after the monomer(s) and/or solvent have been charged into it. At that point, the cylindrical reaction chamber is placed between adjacent rotating rollers in the reactor housing so as to be supported by the rotating rollers. Polymerization can then be initiated by activating the ultra-violet light source. Power to drive the rotating rollers and to circulate cooling air within the reactor housing is also activated before, simultaneously with, or shortly after activating the source of ultra-violet light.

In many cases, it is important to control the polymerization temperature with a narrow range to attain the polymerization rate, ultimate level of conversion, and high or ultra high molecular weight desired. For instance, in the homo-polymerization of acrylic monomer and in co-polymerizations of acrylic monomers with other polymers it is frequently desirable and in some cases it is critical to maintain the polymerization temperature within a range of $-10°$ C. to $50°$ C. The nature of the monomer(s) is defined as the inherent physicochemical properties of the solution as related to ultra-violet light reactivity, pendent functionality, freezing point, boiling point, and all other measurable attributes of the solution mixture which is required for proper conversion to the desired UHMw polymeric matrix. To attain a commercially viable rate of polymerization while attaining the desired high molecular weight the reaction temperature with typically be within the range of about $20°$ C. to about $45°$ C., preferably within the range of about $25°$ C. to about $40°$ C., and most preferably within the range of about $30°$ C. to about $40°$ C. The polymerization temperature utilized will, of course, be at least as high as the freezing point of the monomer system being polymerized (mixture/solutions of monomer(s) and/or solvents utilized).

In the practice of this invention the rate of exothermic reaction is controlled by deactivation the source of ultra-violet light when the reaction temperature reaches a predefined upper limit. One of the keys to generating the high and ultra high molecular weights that can be achieved by utilizing the reactor and techniques of this invention is maintaining the reaction temperature within a relatively narrow range that alloys for this goal to be accomplished. This temperature range is set according to the specific monomer(s) and/or solution being employed to produce the high or ultra high molecular weight polymer matrix. In addition to controlling the rate of polymerization reaction and reaction temperature by activating and deactivating the source of ultra-violet light, the reaction temperature is also kept under control by adjusting the rate of cooling air flow through the reactor housing. By controlling the flow of cooling air through the reactor housing unit, the reactor of this invention is able to maintain control of the overall reaction temperature of the monomer(s) solution in the reaction vessel, thereby allowing excellent control of the exothermic polymerization process. After the polymerization, once the temperature has dropped to a lower limit of the desired temperature range the source of ultra-violet light is reactivated. The activation and reactivation of the ultra-violet light source is continued in a cyclic fashion over the course of the polymerization reaction to control temperature and to prevent runaway exothermic reactions.

The reactor system and technique of this invention can be used to polymerize a wide variety of monomers that are capable of free radical polymerization into useful polymers. The monomer(s) and typically a UV initiator are charged into the cylindrical reaction vessel and purged with an inert gas, such as nitrogen. The photoinitiator is selected from the group consisting of 1-phenyl-2-hydroxy-2-methyl-1-propanone, 2 hydroxy 2-methyl 1-phenyl propan-1-one, 1-hydroxycyclohexyl phenyl ketone, benzophenones, bis-acyl phosphine oxide (BAPO), aminoketones, thioxanthones, cationic photoinitiators and mixtures thereof.

Polymerization is subsequently initiated by subjecting the monomer(s) to UV light. The UV light source will typically provide an intensity which is within the range of 500 microwatts/cm$^2$ to 1 watts/cm$^2$ or which is within the range of 1000 microwatts/cm$^2$ to 100 watts/cm$^2$. The UV light will normally be of a wavelength that is within the range of about 1 nm to about 450 nm and will preferably be within the range of 250 nm to 400 nm. In most cases, it is also important to degas the reaction mixture prior to the polymerization process.

The reactor and technique of this invention are of particular value in synthesizing acrylic polymers from ethylenically unsaturated monomers or mixture of monomers, preferably including at least two different (meth)acrylic monomers. The present process can be applied to the preparation of copolymers from mixtures of two or more (meth)acrylic monomers. In addition, the tacticity control, pseudo-block type architecture and other parameters such as scalability is very important.

The term "(meth)acrylic monomer" as employed herein includes acrylic or methacrylic acid, esters of acrylic or (meth)acrylic acid and derivatives and mixtures thereof, such as but not limited to (meth)acrylamides and (meth)acrylonitriles. Individually, they are referred to as "(meth)acrylic" monomers. Examples of suitable (meth)acrylic monomers are (meth)acrylate esters such as alkyl(meth)acrylates that have 1-15 carbon or fluorine atoms in the alkyl group such as methyl(meth)acrylate, ethyl(meth)acrylate, n-propyl (meth)acrylate, n-butyl(meth)acrylate, isopropyl(meth)acrylate, isobutyl (meth)acrylate, t-butyl(meth)acrylate, n-amyl(meth)acrylate, n-hexyl(meth)acrylate, isoamyl(meth)acrylate, 2-ethylhexyl(meth)acrylate, nonyl(meth)acrylate, lauryl (meth)acrylate, stearyl(meth)acrylate, and the like. Cycloaliphatic (meth)acrylates also can be used such as tri-methylcyclohexyl(meth)acrylate, t-butylcyclohexyl(meth)acrylate, cyclohexyl(meth)acrylate, isobornyl(meth)acrylate, perfluorocyclohexylmethyl acrylate and the like. Aryl(meth)acrylates can also be used such as benzyl(meth)acrylate, phenyl (meth)acrylate, and the like. Examples of fluorinated acrylates such as 1H,1H-Heptafluorobutyl acrylate, 1H,1H, 5H-octafluoropentyl methacrylate, 2,2,3,4,4,4-Hexafluorobutyl acrylate, 2,2,3,4,4,4-Hexafluorobutyl methacrylate, perfluorooctylethyl methacrylate, trifluoroethyl acrylate, trifluoroethyl methacrylate, perfluorooctylethyl acrylate.

Other suitable (meth)acrylic monomers include (meth)acrylic acid derivatives such as: (meth)acrylic acid and its salts, (meth)acrylonitrile, (meth)acrylamide, N-alkyl (meth)acrylamide, N,N-dialkyl(meth)acrylamide and N-phenyl-(meth)acrylamide. Apart from (meth)acrylic monomers, other polymerizable non-(meth)acrylic monomers that can be in multistep process used for forming the polymer include vinyl aromatics such as styrene, t-butyl styrene, vinyl toluene; vinyl acetate, and vinyltrimethoxy silane, or a combination thereof.

In addition, various other (meth)acrylic monomers can be used that have pendant functional groups such as hydroxyl, silane, epoxide, carboxyl or other acid, anhydride, isocyanate, carbamate, and amine groups. Combinations of monomers containing the above-mentioned functional groups are suitable, provided that they do not react with each other under polymerization and storage conditions. While practicing this approach, functional monomers that are reactive under addition polymerization conditions with the reactive diluents should be avoided. (Otherwise, undesirable side reactions will occur.)

Typical ethylenically unsaturated monomers that can be used to introduce crosslinking functional groups into the polymer during or post polymerization include epoxy functional acrylic monomers such as glycidyl(meth)acrylate; carboxyl or other acid functional monomers such as (meth)acrylic acid, maleic acid, itaconic acid, styrene sulfonic acid, acrylamido methyl propane sulfonic acid, vinyl phosphonic or vinyl phosphoric acid; hydroxy functional acrylic monomers such as hydroxyethyl(meth)acrylate, hydroxypropyl (meth)acrylate, 2-hydroxypropyl(meth)acrylate, 3-hydroxypropyl(meth)acrylate, hydroxybutyl(meth)acrylate; amine functional monomers such as t-butyl amino ethyl (meth)acrylate, dimethyl amino ethyl(meth)acrylate, aminoalkyl(meth)acrylates; isocyanate functional monomers such as isocyanatoethyl(meth)acrylate; carbamate functional (meth)acrylic monomers such as 2-(methoxycarbonyl)aminoethyl(meth)acrylate, 2-(cyclohexoxycarbonyl)aminoethyl(meth)acrylate and 2-propenyloxyethyl carbamate; silane functional (meth)acrylic monomers such as vinyl or (meth)acrylic alkoxy silane monomers such as vinyl trimethoxy silane, vinyl methyldimethoxy silane, vinyl triethoxy silane, and vinyl tris(2-methoxyethoxy) silane, gamma-(meth)acryloxy propyl trimethoxysilane, gamma-(meth)acryloxy propyl trimethoxysilane, and gamma-(meth)acryloxypropyltris(2-methoxyethoxy) silane; and the like.

This invention is illustrated by the following examples that are merely for the purpose of illustration and are not to be regarded as limiting the scope of the invention or the manner in which it can be practiced. Unless specifically indicated otherwise, parts and percentages are given by weight and the polymerizations were conducted in a reactor of the type depicted in FIGS. 1-5.

Example 1

In this experiment ultra high molecular weight polymethylmethacrylate (UHMW PMMA) was synthesized utilizing the multi-step technique of this invention. In the first step of the procedure 40.00 grams of methylmethacrylate (MMA) monomer (99.51%) was added to a one neck transparent Pyrex® bottle having a capacity of 1000 ml. This was followed by the addition of 0.20 g of 0.49% 2-Hydroxy-2-methylpropiophenone (UV-2). Polymerization initiated under low UV-intensity with cooling bring provided by circulation cool air over the flask to control heat during the polymerization. A peak in the exothermic reaction was observed after 79 minutes of polymerization time. However, the polymerization temperature was adequately controlled and did not exceed 28° C. during this phase of the process.

In the second step of the procedure used the polymer obtained from the first step was dissolved in additional MMA monomer which acted as a reactive diluent. Such a system where the polymer obtained in a prior polymerization step (base polymer) is dissolved in reactive diluent(s) is called opticlad (OC) and this abbreviation will be used repeatedly henceforth. In the procedure utilized, 38.3 g (20% of total OC solution) of the base polymer (BP) was dissolved in 153.24 g (80% of total OC solution) of MMA with the initial amount of UV-2 from the initial BP at 0.1044% UV-2 of the total OC solution. The second step of the polymerization of the OC showed an exothermic after 88 minutes of UV exposure the polymerization temperature reached 40° C. (the maximum allowable temperature) at which point the UV exposure was terminated with the OC solution being cooled for 22 minutes by continued circulation of cool air over the flask. The UV light source was then activated and the solution temperature peaked after 3 minutes of exposure at about 33° C. No further exothermic temperature peaks were observed.

In the third step of the synthesis procedure, 184.8 g of the base polymer made in the second step was dissolved in 895.43 g of MMA. However, as a result of the high molecular weight attained in the second polymerization step the viscosity of the solution was too high. It was accordingly later poured into the Boston brown blend bottle with additional MMA monomer being added. The solution was subsequently added to the Pyrex flask to finish dissolving the rest of the solid HMw PMMA. The total amount of MMA used to dissolve the PMMA was 2375.62 g with the final UV-2 concentration being reduced to 0.000678%. The OC solution was poured back into the reaction Pyrex for degassing and purge before being transferred into polyethylene bags for the final polymerization to generate UHMW PMMA with desired thickness, shape and form of desired articles.

The final polymerization is allowed to exotherm at whatever temp in order to allow for a more complete conversion of monomer to polymer. Low temp is not desired in the final polymerization step, of a multistep method, because the UHMw is all ready achieved and 100% polymer is desired. The final polymerization step is allowed to exotherm at temperatures just below the boiling point of the monomer in order to achieve a more complete conversion of the monomer to polymer.

The tacticity of the polymethylmethacrylate (PMMA) was found to be 64% syndiotactic, 31% heterotactic, and 5% isotactic. The corresponding glass transition temperature ($T_g$) was found to be 119° C. The glass transition temperature ($T_g$) of conventional PMMA is 105° C. The fact that the UHMW PMMA synthesized in this experiment has a higher $T_g$ is clearly indicative of a higher syndiotactic characteristic which is highly desirable. The molecular weight as determined by Gel Permeation Chromatography (GPC) showed a weight average molecular weight ($M_w$) of 1,900,000 and the polydispersity of the polymer was determined to be 3.04.

The PMMA synthesized in this experiment was determined to have a tensile modulus of 2410 MPa, a stress at yield of 36 MPa, a stress at break of 36 MPa and a strain at break of 2.2% using ASTM D638 (at 0.2 in/min). The Flex modulus and stress at break using ASTM D790 were found to be 3110 MPa and 89 MPa, respectively. The notched Izod Impact (7.5 J) strength at room temperature was found to be 2.08 C ft-lb/in and the specific gravity of the PMMA was determined to be 1.18.

Example 2

In this experiment UHMW heptafluorobutyl acrylate (HFA) was synthesized utilizing the multi-step technique of this invention. The general procedure used was the same as the one utilized in Example 1. However, in the first step of the procedure used 20.45 g (99.51%) of monomer and 0.10 g (0.49%) UV-2 was added to the flask. In this experiment the polymerization temperature did not increase during the course of the reaction conducted in the first step (an exothermic reaction was not observed).

In the second step of the procedure 19.62 g of base polymer was dissolved in 78.49 g of monomer with the UV-2 concentration being 0.1019%. Polymerization temperature peaks were controlled by turning the cooling fan on and off during the course of this polymerization step. A small temperature peak at 32.86° C. was observed after 6 minutes of UV exposure at which point the UV exposure was terminated. After the temperature fell to room temperature, UV exposure was again initiated. After 27 minutes from the start, the temperature reached 31.74° C. and the UV exposure was again terminated. It took 4 minutes to cool back down to room temperature.

In the third step of the procedure, 91.8 g of the base polymer made in the second step was dissolved in 556.54 g monomer, with the UV-2 concentration being 0.01542%. Polymerization was initiated utilizing the same procedure as before. The OC solution was poured back into the reaction Pyrex for degassing and purge before being transferred into polyethylene bags for the final polymerization to generate UHMW HFA with the desired thickness, shape and form of a desired article. The polymerization of the polymer sheet was monitored by three thermocouples with the total heat of polymerization being maintained below 40° C.

The weight average molecular weight of the UHMW HFA was determined by Gel Permeation Chromatography (GPC) to be 1,900,000 and its polydispersity was found to be 2.66. The specific gravity of the polymer synthesized in this experiment was 1.61 and its glass transition temperature ($T_g$) was found to be −21.0° C.

Example 3

In this experiment UHMw MMA was polymerized with heptafluorobutyl acrylate to form a PMMA-co-HFA copolymer utilizing the multi-step technique of this invention. The general procedure use was the same as the one utilized in Example 1. However, in the procedure used the copolymer of heptafluorobutyl acrylate/MMA at a 50/50 mole percent concentration was performed using similar protocols. In the procedure used 14.40 grams of HFA monomer (71.46%) and 5.65 g of MMA monomer (28.04%) was added to a Pyrex reactor bottle with 0.10 g (0.50%) UV-2. The monomer solution was exposed to UV for 129 minutes with no flow being apparent and no overall increase of temperature being observed.

In the second step of the procedure used 18.94 g of the base polymer made in the first step was dissolved with 54.36 g of 254 monomer (71.73%) and 21.42 g of MMA monomer (28.27%). A total weight of 75.78 g of monomers was used to dissolve 18.94 grams of BP and polymerized as previously described. A first exothermic temperature peak at 34.36° C. was observed after 7 minutes of UV exposure, at which point the UV exposure was terminated. After the temperature fell to room temperature, UV exposure was again initiated. At the 29$^{th}$ minute from the start, the temperature reached 33.46° C. and the UV exposure was again terminated. This process of repeated exposure to UV and cut-off was followed 2 more times at 34 minutes and 71 minutes from the start with peak temperatures at 34.95° C. and 35.48° C., respectively.

In the third step of the synthesis procedure 89.05 g of the base polymer made in the second step was dissolved with 255.57 g of 254 monomer (71.74%) and 100.66 g MMA monomer (28.26%) (the total weight of monomers was 356.23 g) and polymerized with only one exothermic polymerization temperature peak at 38.22° C. being observed after 182 minutes of UV exposure. The OC solution was poured back into the reaction Pyrex flask for degassing and purge before being transfer into polyethylene bags for the final polymerization to generate PMMA-co-HFA with the desired thickness, shape and form of a desired article. The weight average molecular weight ($M_w$) of the polymer was determined by Gel Permeation Chromatography (GPC) to be 158,000 and its polydispersity was found to be 2.72. The glass transition temperature ($T_g$) of the PMMA-co-HFA copolymer was also determined to be 67.0° C.

The PMMA-co-HFA copolymer synthesized in this experiment was determined to have a tensile modulus of 12.8 MPa, a stress at yield of 5 MPa, a stress at break of 4.8 MPa and a strain at break of 99.4% using ASTM D638 (0.2 in/min). The notched Izod Impact (7.5 J) strength of the polymer at room temperature was found to be 2.61 C ft-lb/in. The polymer made was also determined to have a specific gravity of 1.45.

Example 4

In this experiment ultra-high molecular weight polymethylmethacrylate was synthesized utilizing the single step procedure of this invention. In the procedure used 950.00 g of MMA monomer (99.99369%) and 0.06 g of 0.00631% 2-hydroxy-2-methylpropiophenone (UV-2) was added to a one neck 1000 ml transparent Pyrex polymerization bottle. The solution was mixed, degassed and purged with nitrogen in the Pyrex bottle. It was then transferred to a 6 inch (wide) by 4 foot (long) polyethylene bag under a nitrogen atmosphere. It was subsequently placed in the reactor and exposed to low intensity UV light with the cooling fan being used to control heat buildup during the polymerization. This polymerization showed an exothermic temperature peak 1440 minutes after polymerization was initiated. The polymerization temperature was well controlled and did not even exceed a maximum temperature of 36° C. The viscosity of the PMMA produced at a solution concentration of 6.82 weight percent was found to be 3,800 cPs compared to 1,350 cPs for the UHMw PMMA polymerized via the step multi-step process of Example 1. Similarly, the glass transition temperature ($T_g$) was found to be 120° C. which is once again higher than the $T_g$ of regular PMMA (105° C.) and is indicative of higher syndiotactic nature. The heat deflection temperature (HDT) of the polymer at 66 psi was found to be 120° C., which is significantly higher than comparative commercial HDT values of PMMA.

Example 5

In this experiment a UHMW pseudo-block copolymer was synthesized utilizing the multi-step technique of this invention. In the procedure used polymerization of 50 grams (20.23 mol percent) butyl acrylate was first initiated in a 250 ml Pyrex cylindrical glass reactor using 0.2 grams (0.06 mol percent) UV-2 photo-initiator. After polymerization of the butyl acrylate, 153.8 grams (79.71 mol percent) methylmethacrylate monomer was added to dissolve butyl acrylate from the first polymerization step. Upon complete dissolution, the polymer solution was degassed and transferred to a 3 inch (wide) by 0.5 foot (long) polyethylene bag under a nitrogen atmosphere. Without any further photo-initiator addition the second polymerization step of methylmethacrylate monomer containing the poly(butyl acrylate) solution was conducted. The polymerization of butyl acrylate showed an exothermic temperature peak at 19 minutes and the methylmethacrylate monomer containing polymerized butyl acrylate showed an exothermic peak at 124 minutes after polymerization was initiated. The block nature of the polymer was clearly evident by having the two characteristic glass transition temperatures ($T_g$) of −49.0° C. and 124.0° C. corresponding to the poly(butylacrylate) block and the poly(methylmethacrylate) block, respectively.

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing an ultra-high molecular weight polymer which comprises (1) polymerizing at least one ethylenically unsaturated monomer in the presence of a photo-initiator into a solid polymer, wherein the photo-initiator is present at a level which is less than 0.01 weight percent, wherein said polymerization is initiated with ultra-violet light; (2) dissolving the solid polymer into a liquid monomer and/or solvent to make a polymer solution wherein no additional photo-initiator is added to the polymer solution; (3) exposing the polymer solution to ultra-violet light; (4) allowing the polymerization to continue to produce a polymer of higher molecular weight; wherein the polymerization temperature is not allowed to exceed 30° C. in step (1), step (2), step (3) or step (4) of the process.

2. A process as specified in claim 1 wherein the polymerization is conducted in step (1) until a solids content of at least 99% is attained.

3. A process as specified in claim 1 wherein the ultra-violet light provides an intensity of 100 microwatts/cm$^2$ to 1 watts/cm$^2$ and wherein the ultra-violet light has a wavelength within the range of 200 to 450 nm.

4. A process as specified in claim 1 wherein the monomer is selected from the group consisting of alkyl(meth)acrylates having alkyl groups containing from 1-15 carbon atoms, methyl(meth)acrylate, ethyl(meth)acrylate, n-propyl(meth)acrylate, n-butyl (meth)acrylate, isopropyl(meth)acrylate, isobutyl(meth)acrylate, t-butyl(meth)acrylate, n-amyl (meth)acrylate, n-hexyl(meth)acrylate, isoamyl(meth)acrylate, 2-ethylhexyl (meth)acrylate, nonyl(meth)acrylate, lauryl (meth)acrylate, stearyl(meth)acrylate, trimethylcyclohexyl (meth)acrylate, t-butylcyclohexyl(meth)acrylate, cyclohexyl (meth)acrylate, isobornyl(meth)acrylate, perfluorocyclohexylmethyl acrylate, benzyl (meth)acrylate, phenyl(meth)acrylate, 1H,1H-heptafluorobutyl acrylate, 1H,1H,5H-octafluoropentyl methacrylate, 2,2,3,4,4,4-hexafluorobutyl acrylate, 2,2,3,4,4,4-hexafluorobutyl methacrylate, perfluorooctylethyl methacrylate, trifluoroethyl acrylate, trifluoroethyl methacrylate, perfluorooctylethyl acrylate, (meth)acrylic acid derivatives, (meth)acrylic acid and its salts, (meth)acrylonitrile, (meth)acrylamide, N-alkyl (meth)acrylamide, N,N-dialkyl(meth)acrylamide, and N-phenyl-(meth)acrylamide.

5. A process as specified in claim 1 which further comprises polymerizing at least one monomer selected from the group consisting of styrene, t-butyl styrene, vinyl toluene; vinyl acetate, and vinyltrimethoxy silane, or a combination thereof.

* * * * *